(12) United States Patent
Stevens et al.

(10) Patent No.: US 7,393,145 B1
(45) Date of Patent: Jul. 1, 2008

(54) FAULT LOCATION IN OPTICAL NETWORKS

(75) Inventors: Rick C. Stevens, Apple Valley, MN (US); Charles J. Kryzak, Mendota Heights, MN (US); Gordon A. Keeler, Albuquerque, NM (US); Darwin K. Serkland, Albuquerque, NM (US); Kent M. Geib, Tijeras, NM (US); William P. Kornrumpf, Schenectady, NY (US)

(73) Assignees: Lockheed Martin Corporation, Bethesda, MD (US); Sandia Corporation, Albuquerque, NM (US)

( * ) Notice: Subject to any disclaimer, the term of this patent is extended or adjusted under 35 U.S.C. 154(b) by 48 days.

(21) Appl. No.: 11/285,244

(22) Filed: Nov. 22, 2005

Related U.S. Application Data

(60) Provisional application No. 60/674,843, filed on Apr. 26, 2005.

(51) Int. Cl.
*G02B 6/43* (2006.01)
(52) U.S. Cl. ..................... 385/89; 250/227.15
(58) Field of Classification Search ............... None
See application file for complete search history.

(56) References Cited

U.S. PATENT DOCUMENTS

| | | | | |
|---|---|---|---|---|
| 3,981,592 A | | 9/1976 | Williams | |
| 4,070,118 A | | 1/1978 | Maslowski et al. | |
| 4,367,483 A | * | 1/1983 | Takahashi et al. | 257/80 |
| 4,511,248 A | * | 4/1985 | Abbas | 356/4.07 |
| 4,518,255 A | * | 5/1985 | Zuleeg | 356/5.08 |
| 4,577,209 A | * | 3/1986 | Forrest et al. | 257/432 |
| 5,224,111 A | * | 6/1993 | Stilwell et al. | 398/5 |
| 5,663,944 A | * | 9/1997 | Mun | 369/121 |
| 6,434,309 B1 | * | 8/2002 | Abbott et al. | 385/123 |
| 6,960,791 B2 | * | 11/2005 | Narui et al. | 257/82 |
| 2005/0157770 A1 | * | 7/2005 | Behfar et al. | 372/50 |
| 2006/0039434 A1 | * | 2/2006 | Coleman | 372/50.1 |
| 2007/0036493 A1 | * | 2/2007 | Brenner et al. | 385/89 |

OTHER PUBLICATIONS

G.A. Keeler et al. In-situ OTDR measurements for single-mode optical networks with a standard VCSEL. 17th Annual Meeting of the IEEE Lasers and Electro-Optics Society (LEOS 2004), vol. 2, pp. 681-682, Nov. 2004.*

J. Cross et al. A single-fiber bidirectional optical link using colocated emitters and detecters. IEEE Photonics Technology Letters, vol. 8, No. 10, pp. 1385-1387, Oct. 1996.*

(Continued)

*Primary Examiner*—Michelle Connelly-Cushwa
*Assistant Examiner*—Mike Stahl
(74) *Attorney, Agent, or Firm*—Brooks, Cameron & Huebsch, PLLC

(57) ABSTRACT

One apparatus embodiment includes an optical emitter and a photodetector. At least a portion of the optical emitter extends a radial distance from a center point. The photodetector provided around at least a portion of the optical emitter and positioned outside the radial distance of the portion of the optical emitter.

33 Claims, 3 Drawing Sheets

OTHER PUBLICATIONS

M.K. Barnoski, and S.M. H Jensen, "Fiber Waveguides: a novel technique for investigating attenuation characteristics," Appl. Opt., 15, 2112-2115 (1976).

Dragas, "Dual-Purpose VCSELs for Short-Haul Bidirectional Communication Links," IEEE Photon. Technol. Lett., Dec. 1999, vol. 11, No. 12 1548-1550.

C.B. Kuznia, "Flip chip bonded optoelectronic devices on ultra-thin silicon-on-sapphire," Optical Fiber Communications Conference 2001 Technical Digest, TuR4/1-T4/3 (2001).

Thrush,"Integrated Semiconductor Vertical-Cavity Surface-Emitting Lasers and PIN Photodetectors for Biomedical Fluorescence Sensing,"(2004),IEEE J.Quantum Electron,40,491-498.

* cited by examiner

FAULT LOCATION IN OPTICAL NETWORKS

CROSS-REFERENCE TO RELATED APPLICATIONS

This application claims the benefit of U.S. Provisional Application No. 60/674,843, filed Apr. 26, 2005, the entire content of which is incorporated herein by reference.

GOVERNMENT RIGHTS

This invention was made with Government support under Contract No. DE-AC04-94AL85000 awarded by the U.S. Department of Energy. The Government has certain rights in the invention.

FIELD OF THE INVENTION

The present disclosure generally relates to fault detection and location in fiber optic pathways. And, in particular, the present disclosure relates to fault location in optical networks, and other such fields.

BACKGROUND

In optical fiber communications, an optical fiber sometimes has to be analyzed to determine if a disconnect in the optical pathway exists and/or where the disconnect is located. For example, in some instances, it may be that the location of a fault within an optical fiber has to be ascertained, so that the disconnect can be repaired.

Oftentimes, this is accomplished by disconnecting the optical fiber from a transmitter and/or receiver so that the optical pathway of the optical fiber can be tested. The testing typically involves attaching an end of the optical fiber to a separate testing apparatus.

Optical Time-Domain Reflectometry (OTDR) is one method used to locate such faults (e.g., disconnect in the fiber) in fiber optic networks. In this method, a laser pulse is sent down a test fiber and reflected back by a fault in the optical pathway. The reflected laser pulse is then received by a photodetector. The time period elapsed since the signal was sent indicates how far down the pathway the fault is located.

However, the use of a separate testing apparatus to locate faults within an optical fiber can be time consuming and costly. In order to test the optical pathway, the testing equipment can be connected via a fiber access point which adds components to the optical network and can degrade the signal as it travels along the optical pathway.

Alternatively, an end of the optical fiber can be located and disconnected from the optical network. For example, optical pathways forming an optical network are typically constructed using a number of optical fibers. Each optical fiber section is attached to the end of another optical fiber section. In some embodiments, an end of one of the optical sections can be accessed and the testing equipment can be connected thereto. Such methods also result in periods where the fiber is out of the communications network and therefore can result in network downtime.

Furthermore, in some instances, a trained operator may have to be present to use the specialized testing apparatus. The separate test apparatus that has been proposed for use in diagnosing such disconnects includes a separate laser and photodetector that is to be connected to an optical fiber via a splitter. The splitter is used so that an outgoing light pulse is routed from the laser to the optical pathway, while a reflected signal is directed to the detector rather than back to the laser.

SUMMARY

Embodiments of the present disclosure provide an optical fault identification and location apparatus which can be built into a fiber optic transmitter and/or receiver, other network component, or as a separate component of the network, so that the fiber can remain connected to the communications network. Some embodiments can be used to determine the location of a fault in a grid of fibers. This implementation can be useful in determining structural damage to a surface, for example, if the grid is positioned over the surface. Additionally, a separate testing apparatus for locating faults within an optical fiber does not have to be utilized. Embodiments of the present disclosure can also be used as separate testing apparatuses, thereby reducing the number of components of the testing device, among other benefits.

In various embodiments, an optical transmitting and receiving apparatus includes an optical emitter and a photodetector. In such embodiments, the optical emitter includes at least a portion that extends a radial distance from a center point. For example, in the case of an optical emitter having a circular cross-section the entire peripheral edge of the circular circumference could be said to extend to a radial distance from a center point.

In various embodiments, a center point can be a point at the center of an optical pathway, the center point of an emitter, or the center point of an optical fiber, for example. In emitters having cross-sectional shapes that are not circular or that are located off center from a center point of an optical fiber, a point on the periphery of the emitter may be deemed to extend to a radial distance and this can be used to determine the location of the one or more photodetector elements.

The photodetector can include one or more photodetector elements. These elements can be provided around at least a portion of the optical emitter. In various embodiments, the photodetector elements can be positioned outside the radial distance of the portion of the optical emitter. The benefits of such an arrangement will be discussed in more detail below. Generally, however, this arrangement allows the emitter and photodetector to be used without a splitter and to occupy a smaller amount of space.

The photodetector elements can also be arranged in a plane perpendicular to the optical pathway, among other orientations. In this way, they can present a large amount of surface area for the light wave to contact.

The photodetector elements can be immediately adjacent to each other or can be spaced with respect to each other as illustrated in some of the embodiments shown in the figures provided with the present disclosure. Additionally, in some embodiments, the photodetector can completely surround the emitter.

The emitter can be positioned to emit a light wave through an optical pathway. Emitters can be of various types, but generally speaking, emitters are components that emit light. These components can be used to communicate information, such as by pulsed light, changing frequency and/or wavelength, changing intensity, and other methods. One example of an emitter is a Vertical Cavity Surface Emitting Laser (VCSEL). The benefits of an embodiment using a VCSEL will be discussed in more detail below.

A photodetector can be positioned to receive a reflected light wave directed toward the photodetector through the optical pathway. Photodetectors can also be of various types, but generally speaking, photodetectors are components that detect light contacting a surface of the photodetector. One example of a suitable type of photodetector is a p-i-n (positive, intrinsic, and negative) photodiode, while another suitable type is a resonant cavity photodetector (RCPD), among others.

The photodetector can be designed and positioned to receive a reflected light wave (e.g., pulse) that was emitted by the emitter. In this way, the reflected light wave includes at least a portion of the emitted light wave created by the emitter.

In various embodiments, the photodetector can be positioned to receive a test pulse from another emitter located at another position along the optical pathway. Such embodiments can be used, for example, to identify whether a fault is present between the emitter and photodetector.

Embodiments of the present disclosure can also be used to measure the power output of the emitter. Based upon a known reflectivity for a known emitted light output power, the received reflected light wave can be compared to adjust, for instance, the power output, the sensitivity of the detector, and other such parameters of the optical system and/or network.

The emitter and photodetector, in the various embodiments of the present disclosure, can be separate components or can be integrated into a single component. Further, the emitter and photodetector can be manufactured using the same process and can be manufactured as a single component.

In various embodiments, a logic component can be provided with or associated with the emitter and/or the photodetector. The logic component can be provided separately or integrated with the emitter and/or photodetector.

The logic component can, for example, be used to compute the distance of a reflection point based upon the elapsed time between the emitting of a light wave and the reception of a reflected light wave. In some embodiments, the logic component can suggest a type of reflection point based upon the intensity of a reflected light wave.

In some embodiments, the radial distance of the optical emitter is less than a radial distance of an optical pathway. In such embodiments, this allows for the emitter to be positioned adjacent the entrance to an optical pathway, or positioned at a distance to the entrance. When positioned at a distance, the spread of the light as it is emitted can be evaluated in order to place the emitter close enough for a suitable amount of light to enter the optical pathway. An example and discussion of an embodiment having such suitable positioning is provided below.

The detector, in some embodiments, can have an outer radial distance from the center point of the emitter that is greater than a radial distance of an optical pathway. In this way, when the detector is positioned at a distance from the entrance, the detector can be contacted by more of the light as the light spreads as it exits the light pathway.

According to the embodiments of the present disclosure, a Vertical Cavity Surface Emitting Laser (VCSEL) can be used as an optical transmitter to transmit information through an optical fiber. The VCSEL can be partially or completely surrounded by a photodetector having one or more photodetector elements. This allows the optical system to provide a real-time, in-situ fault identification, location, measurement and other such functions to the optical network, for example. In some embodiments, the availability of such functions on the optical system can allow for automation of one or more of the functions.

The functions discussed above can be accomplished, for example, by circuitry and/or by having a processor and memory within or attached to the optical system. Computer executable instructions can be provided in the memory and executable by the processor can communicate with the emitter and/or detector to obtain information about the emission and/or receipt of a light wave. These and other advantages of the present invention will become evident to those skilled in the art.

DETAILED DESCRIPTION

The present disclosure includes a number of device and system embodiments for transmitting and receiving light waves. Embodiments of the present disclosure will now be described in relation to the accompanying drawings, which will at least assist in illustrating the various features of the various embodiments.

Figure 1:
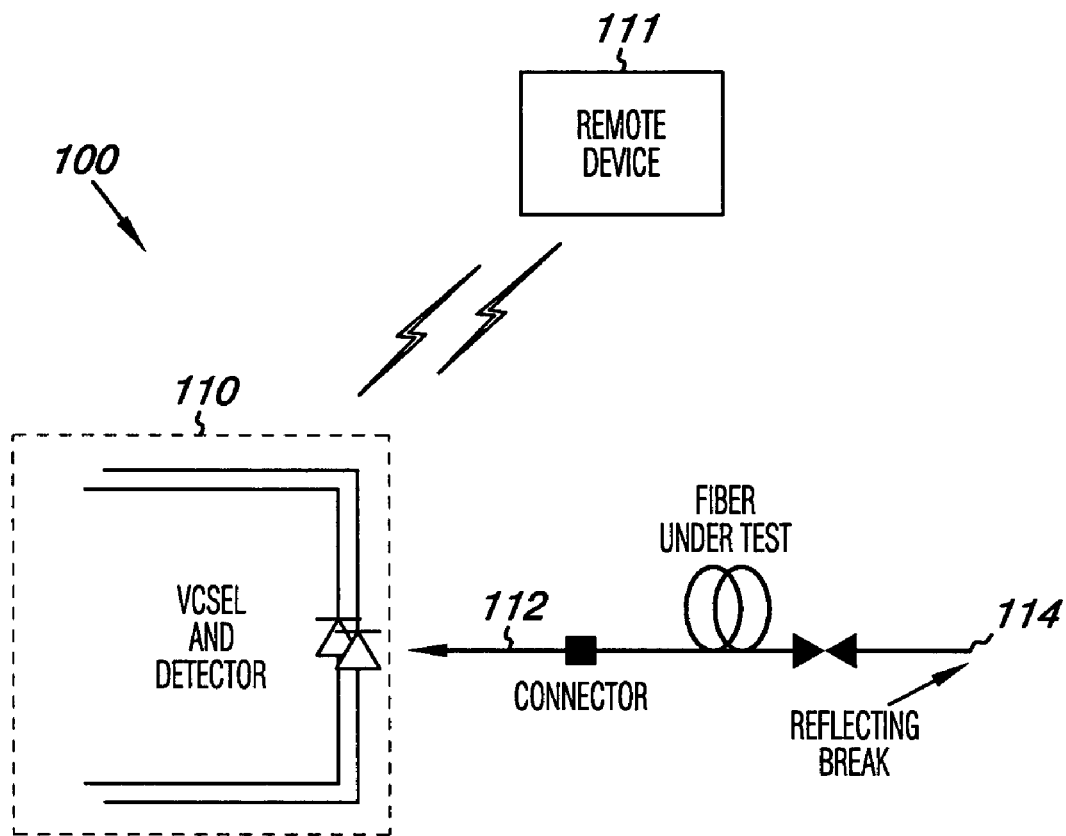
FIG. 1 is an illustration of an embodiment of an optical network of the present disclosure.

FIG. 1 is an illustration of an embodiment of an optical network of the present disclosure. The embodiment shown in FIG. 1 illustrates an optical system 100 having an integrated emitter and detector (e.g., VCSEL and detector) 110. The emitter and detector component 110 is positioned to send and receive light waves via an optical path within an optical fiber 112.

The optical fiber may be made up of a number of optical fiber sections that are connected end to end by a number of connectors. In the example shown in FIG. 1, the fiber under test 112 has two sections connected by a connector and has a reflecting break 114.

The reflecting break 114 can be any type of fault that would reflect light back to the receiver portion of the emitter and detector component 110. For example, the fault can be a defect in the optical fiber, a break in the optical pathway, the end of an optical fiber section, or other such disconnection. In the embodiment shown in FIG. 1, the emitter 110 emits a light signal that is directed at an end of the optical pathway of optical fiber 112.

In various embodiments, one or more lenses and/or mirrors can be positioned between the emitter and the end of the optical path. The lenses and/or mirrors can be used to focus or direct the light signal into the end of the optical pathway.

The signal travels down the optical pathway until it either reaches its destination, or it, or a portion of it, is reflected back through the optical pathway toward the emitter and detector component 110. The reflected light exits the end of the optical pathway and contacts a surface of the detector and, thereby, a detection of a fault is made.

As stated above, an optical emitter and/or detector component can be connected to a logic component that can be used to determine if the light detected by the detector is that of the reflected light. The logic component can be circuitry provided within or associated with the emitter and/or detector component or a processor within or associated with one or more of the components.

The logic component can also be resident on a remote device (e.g., remote device 111) that is not part of the optical system or network. For example, a logic component can be resident on a personal, mainframe, or server type computer. Further, the communication of information from the emitter, the detector, and/or the logic component to a remote device can be accomplished in a wired or wireless manner.

Once information is received from the emitter and/or detector component the information can be compared to thresholds or to information stored in memory to identify whether the information indicates a fault is present. The information can also be used to determine how far away the fault is. For example, an OTDR methodology can be used to determine the location of the fault. Accordingly, in some embodiments, the logic components can include a clock or other timing mechanism to aid in such determinations.

Embodiments of the present disclosure can also provide information about the type of disconnect that is present and information about the quality of the signal being generated and received. For example, in some embodiments, the percentage of reflected light can provide an indication as to the type of disconnect in the optical pathway. For instance, the end of a section of optical fiber can generate a measurable and predictable reflected quantity of light (e.g., 4% of emitted light is reflected from an un-terminated fiber facet).

If the break is not generally perpendicular to the optical pathway, as a section end would be, but is rather, a jagged break or a defect in the optical pathway, the result can be less predictable. However, the results may be able to be classified based upon the received information in order to determine whether the break is clean or jagged, etc. This information may be used to determine the course of action in repairing the break or replacing the section or a portion thereof.

Further, in some embodiments, the location of the disconnect can be located based upon information regarding the reflected light. For example, if the time from the emitting of the light signal to the time at which a reflected signal is received can be calculated, then the location of the break can be determined. Other criteria may also be used in this computation. For example, the speed at which light travels through the material of the optical pathway, the actual distance a light signal travels within the optical pathway, and temperature, humidity, and other environmental factors, among other criteria.

In various embodiments, one or more amplifiers can be used to boost clarity of the received reflected signal. Additionally, the sensitivity of the receiver component can be increased. For example, signal averaging, avalanche gain in the detector, and decreasing amplifier bandwidth are some methods of increasing the sensitivity of the receiver component.

Figure 2A:
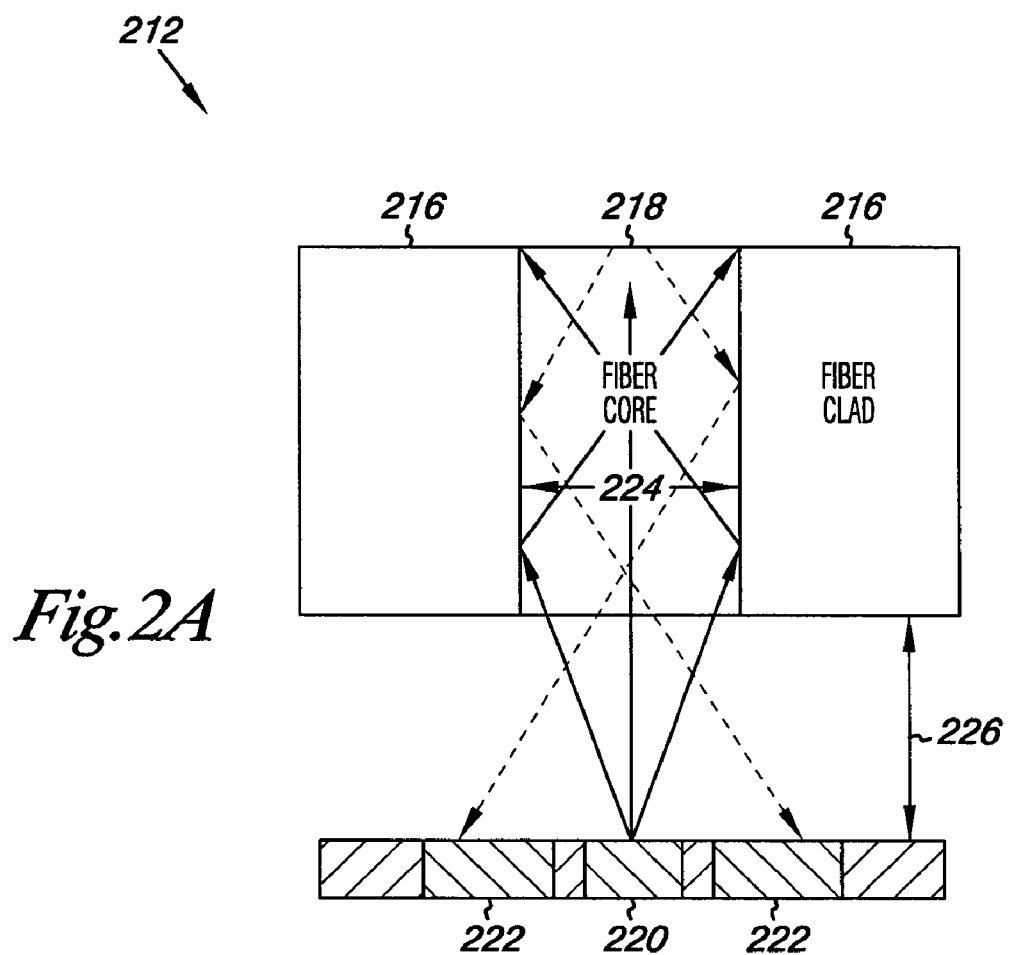
FIG. 2A is a side perspective illustration of an embodiment of a set of transmitter and receiver components.

FIG. 2A is a side perspective illustration of an embodiment of a set of transmitter and receiver components. In the embodiment shown in FIG. 2A, the end of an optical fiber 212 is illustrated. In this embodiment, the optical fiber 212 has a fiber cladding 216 that surrounds a fiber core 218 which is symmetrically aligned along the central axis of the optical fiber 212.

The transmitter and receiver components 220 and 222 are positioned at a distance 226 from the end of the optical fiber 212. In this way, the receiving portions 222 can be contacted by light that has spread out as it has exited the fiber core 218 which acts as the optical pathway of the optical fiber. This can be beneficial, for example, where a transmission component (e.g., emitter) 220, when placed adjacent to the end of the fiber core, would allow limited space for placement of receiver components 222 against the fiber core 218.

It also may be the case, that as the light waves exit the end of the fiber core 218, they are generally directed toward contact with the surface of the transmission component. In such instances, by positioning the transmitter and receiver components 220 and 222 at a distance 226 from the end of the optical fiber 212, the trajectories of the light waves may substantially miss the transmission component 220 and contact the receiver component 222.

Since each optical system and/or network may be different, the positioning of the various components may be different. One example provides a multi-mode optical fiber having a fiber core with width 224 of 50 microns (i.e., a radius of 25 microns). Another common fiber core width is 62.5 microns.

In this example, the transmission component 220 has a width of 10 microns (i.e., a radius of 5 microns) and the total width of the transmitter and receiver components 220 and 222 of 70 microns. The transmitter and receiver components 220 and 222, in this example, are positioned 20 microns from the end of the fiber core 212. In this way, as the light exits that end of the fiber core 218, it can spread out radially 10-20 microns (i.e., approximately 10 microns for a 62.5 micron core and 20 microns for a 50 micron core) and still come into contact with the receiver component 222.

Figure 2B:
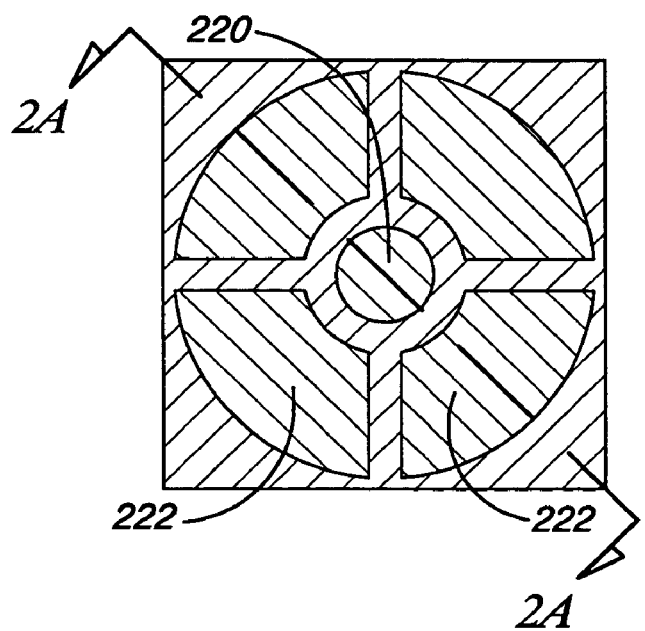
FIG. 2B is a top perspective illustration of the embodiment of FIG. 2A.

FIG. 2B is a top perspective illustration of the embodiment of FIG. 2A. In this embodiment, the transmitter and receiver components are provided as an integrated apparatus having an emitter 220 that provides the transmission functionality and a photodetector having a number of photodetector elements 222.

The emitter 220 is positioned in the middle of the component and has a generally circular shape, defined by a circular circumference at its periphery. In this embodiment, the emitter is located in the center of the component.

The photodetector, in the embodiment shown in FIG. 2B has four photodetector elements 222 that are positioned around the emitter 220. They are positioned such that they are outside of the radial distance that defines at least a portion of the circumference of the emitter 220.

As shown, the photodetector elements 222 can be spaced with respect to each other and with respect to the emitter 220. The spacing can provide a number of benefits, such as, allowing for the lateral oxidation of the emitter, and placement of electrical contacts for one or more of the emitter and detector elements.

Alternatively, one or more of the elements 222 can be positioned adjacent to each other and/or the emitter 220. Further, in some embodiments, a single photodetector element can be used to partially or, in some cases, completely surround the emitter.

When light contacts the photodetector, the apparatus can be designed so that the photodetector elements are connected together and a signal is sent via a single connection to a logic component for interpretation of the information. In some embodiments, the photodetector elements can be independently connected to a logic component. In such embodiments, the information obtained by the logic component can include, for example, whether light has contacted the detector surface, the intensity of the light, the location of the contact, and other such information that may be useful for providing functionality to the optical system and/or network.

Figure 3A:
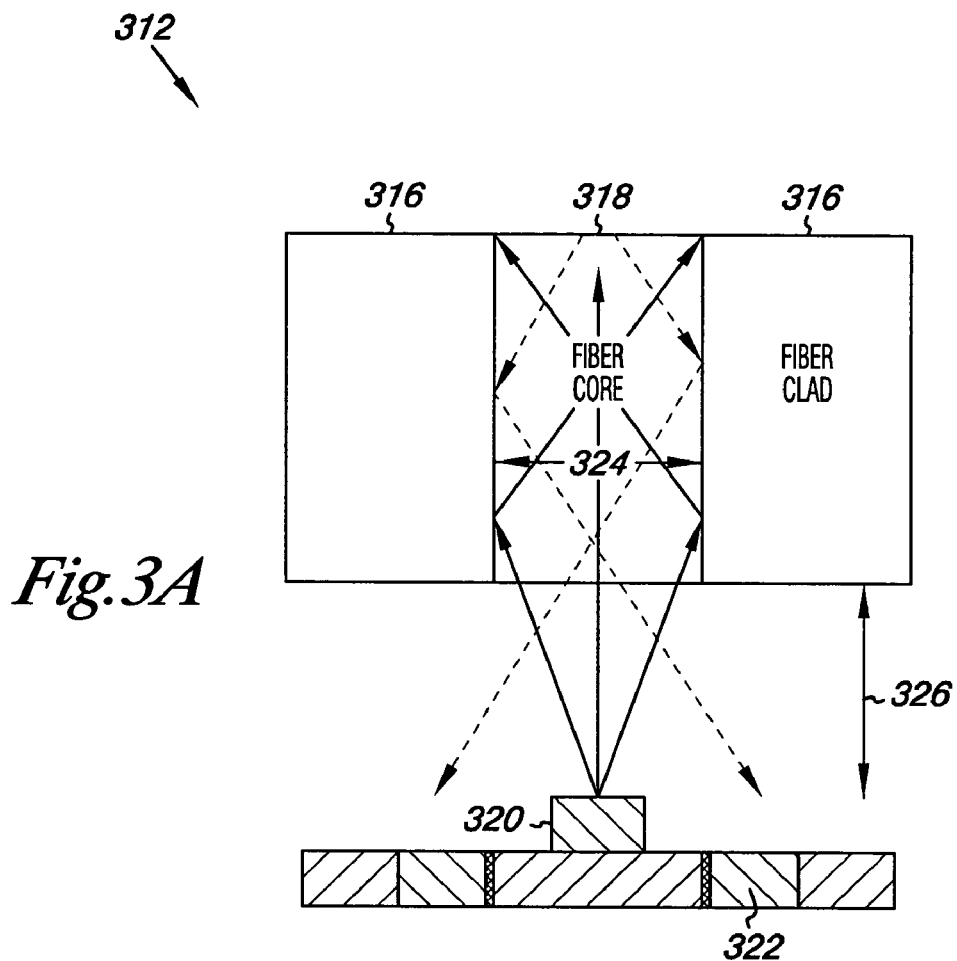
FIG. 3A is a side perspective illustration of an embodiment of a set of transmitter and receiver components.

FIG. 3A is a side perspective illustration of an embodiment of a set of transmitter and receiver components. In the embodiment shown in FIG. 3A, the end of an optical fiber 312 is illustrated. In this embodiment, as with the embodiment discussed above in FIG. 2A, the optical fiber 312 has a fiber cladding 316 that surrounds a fiber core 318 which is symmetrically aligned along the central axis of the optical fiber 312 The fiber core also provides the optical pathway for the communication of light therethrough.

The transmitter and receiver components 320 and 322 are positioned at a distance 326 from the end of the optical fiber 312. In this embodiment the emitter 320 (i.e., the transmitter component) is positioned on a surface of the detector 322 (i.e., the receiver component).

In contrast, the emitter 220 of FIG. 2A was positioned in the middle of a number of detector elements 222. The components 220 and 222 were also oriented in a single plane generally perpendicular to the optical pathway 218, whereas the components in the embodiment illustrated in FIG. 3A are oriented in two planes that are generally parallel to each other and generally perpendicular to the optical pathway 318.

Although, shown in FIGS. 2A, 2B, 3A, and 3B as being symmetrical designs and having the emitter located symmetrically at the center of the detectors in each Figure, various embodiments may have their components positioned in a non-symmetrical manner. For example, the embodiments may have components that are non-symmetrical in shape and/or the emitter may be positioned in an off center orientation with respect to the one or more detectors and/or the fiber core. In such embodiments, the center point of the emitter, for example, can be used to define an emitter radius to one or more points around the circumference of the emitter.

Both such structures (i.e., 2A and 3A) can be formed using deposition techniques to form either or both of the emitter and photodetector components. For example, in the embodiment of FIG. 2A, the emitter 220 and the photodetector elements 222 can be formed from the same epitaxial layers (e.g., those of an 850-nm oxide-confined VCSEL). In the embodiment of FIG. 3A, the emitter 320 and the photodetector elements 322 can be formed together, but in different epitaxial layers.

It also may be the case, that as the light waves exit the end of the fiber core 318, they are generally directed toward contact with the surface of the transmission component. In such instances, by positioning the transmitter and receiver components 320 and 322 at a distance 326 from the end of the optical fiber 312, the trajectories of the light waves may substantially miss the transmission component 320 and contact the receiver component 322.

Since each optical system and/or network may be different, the positioning of the various components may be different. One example provides a multi-mode optical fiber having a fiber core with width 324 of 50 microns (i.e., a radius of 25 microns). Another common fiber core width is 62.5 microns.

In this example, the transmission component 320 has a width of 10 microns (i.e., a radius of 5 microns) and the total width of the transmitter and receiver components 320 and 322 of 70 microns. The transmitter and receiver components 320 and 322, in this example, are positioned 20 microns from the end of the fiber core 312. In this way, as the light exits that end of the fiber core 318, it can spread out radially 10-20 microns (i.e., approximately 10 microns for a 62.5 micron core and 20 microns for a 50 micron core) and still come into contact with the receiver component 322.

Figure 3B:
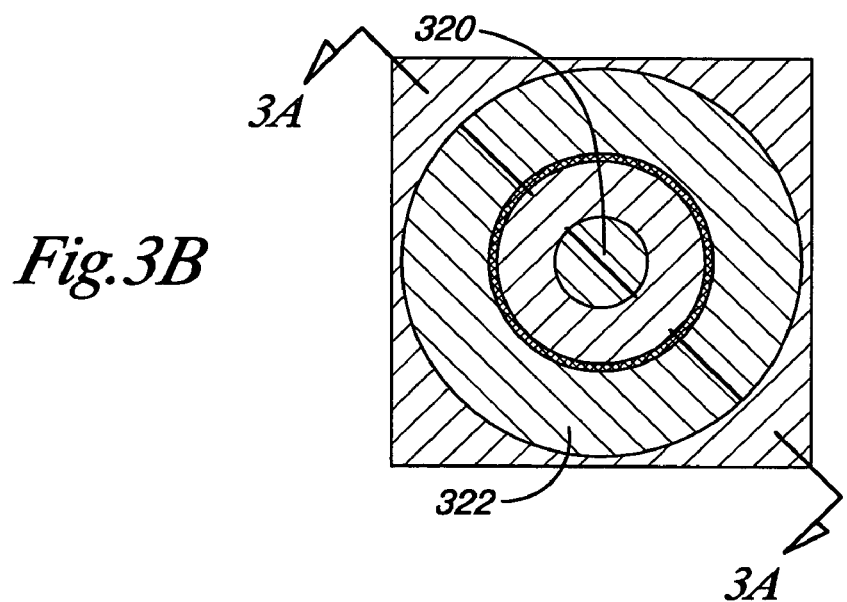
FIG. 3B is a top perspective illustration of the embodiment of FIG. 3A.

FIG. 3B is a top perspective illustration of the embodiment of FIG. 3A. The photodetector, in the embodiment shown in FIG. 3B has one photodetector element 322 that is positioned under the emitter 320. It is positioned such that a portion of it lies outside of the radial distance that defines at least a portion of the circumference of the emitter 320.

As shown, the photodetector element 322, or multiple photodetector elements, can be spaced with respect to each other and with respect to the emitter 320. Alternatively, the element 322 can be positioned adjacent to, above, or below the emitter 320. In this embodiment, a single photodetector element is used that lies below the emitter 320 and extends radially outside the circumference of the emitter. In some embodiments, the photodetector can be viewed as completely surrounding the emitter, when viewed from the perspective of directly in front of the emitter.

In such embodiments, the information obtained by the logic component can include, for example, whether light has contacted the detector surface, the intensity of the light, the location of the contact, and other such information that may be useful for providing functionality to the optical system and/or network, as discussed above with respect to the multiple photodetector elements of FIG. 2B.

Although specific embodiments have been illustrated and described herein, those of ordinary skill in the art will appreciate that any arrangement calculated to achieve the same techniques can be substituted for the specific embodiments shown. This disclosure is intended to cover adaptations or variations of various embodiments of the invention. It is to be understood that the above description has been made in an illustrative fashion, and not a restrictive one.

Combination of the above embodiments, and other embodiments not specifically described herein will be apparent to those of ordinary skill in the art upon reviewing the above description. The scope of the various embodiments of the invention includes various other applications in which the above structures and methods are used. Therefore, the scope of various embodiments of the invention should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

What is claimed is:

1. An optical transmitting and receiving apparatus, comprising:
    a fiber core, which acts as an optical pathway, having an end surface used by both an optical emitter and a photodetector;
    the optical emitter positioned to emit a light wave through the optical pathway, wherein at least a portion of the optical emitter extends a radial distance from a center point; and
    the photodetector provided around at least a portion of the optical emitter and positioned to receive a reflected light wave, which includes at least a portion of the light wave emitted, directed toward the photodetector through the optical pathway, outside the radial distance of the portion of the optical emitter.

2. The apparatus of claim 1, wherein the photodetector includes a number of photodetector elements arranged around the optical emitter.

3. The apparatus of claim 2, wherein the photodetector elements are arranged in a plane perpendicular to an optical pathway.

4. The apparatus of claim 2, wherein the photodetector elements are spaced with respect to each other.

5. The apparatus of claim 2, wherein the photodetector elements surround the emitter.

6. The apparatus of claim 1, wherein the photodetector surrounds the emitter.

7. An optical transmitting and receiving system, comprising:
- a fiber core, which acts as an optical pathway, having an end surface used by both an optical emitter and a means for detecting;
- the optical emitter extending a radial distance from a center point and positioned to emit a light wave through the optical pathway; and
- the means for detecting a light wave provided around at least a portion of the optical emitter and positioned to receive a reflected light wave, which includes at least a portion of the light wave emitted, directed toward the means for detecting through the optical pathway, outside the radial distance of the optical emitter.

8. The system of claim 7, wherein the means for detecting a light wave includes a photodetector having multiple discrete elements.

9. The system of claim 7, wherein the means for detecting a light wave is a photodetector.

10. The system of claim 7, wherein the system further includes a logic component that can compute the distance of a reflection point based upon the elapsed time between the emitting of a light wave and the reception of a reflected light wave.

11. The system of claim 7, wherein the system further includes a logic component that can suggest a type of reflection point.

12. The system of claim 7, wherein the system further includes a logic component that can suggest a type of reflection point based upon the intensity of a reflected light wave.

13. An optical transmitting and receiving system, comprising:
- a fiber core, which acts as an optical pathway, having an end surface used by both an optical emitter and a detector;
- the optical emitter extending a radial distance from a center point and positioned to emit a light wave through the optical pathway;
- the detector to detect a light wave provided around at least a portion of the optical emitter and positioned to receive a reflected light wave directed toward the photodetector through the optical pathway, outside the radial distance of the optical emitter; and
- a logic component that can compute the distance of a reflection point based upon the elapsed time between the emitting of a light wave by the optical emitter and the reception of a reflected light wave.

14. The system of claim 13, wherein the optical emitter is a laser.

15. The system of claim 13, wherein the optical emitter is a vertical cavity surface emitting laser.

16. The system of claim 13, wherein the optical emitter and detector are manufactured as a single component.

17. The system of claim 16, wherein the emitter of the single component is a vertical cavity surface emitting laser that can act as a detector to detect the reflected light wave.

18. The system of claim 13, wherein the radial distance of the optical emitter is less than a radial distance of an optical pathway.

19. The system of claim 13, wherein the detector has an outer radial distance from the center point of the emitter and wherein the outer radial distance is greater than a radial distance of an optical pathway.

20. The system of claim 13, wherein the optical emitter and the detector are arranged in a plane that is substantially perpendicular to an optical pathway.

21. The system of claim 13, wherein the optical emitter and detector are combined into an integrated component.

22. The system of claim 21, wherein the emitter of the integrated component is a vertical cavity surface emitting laser.

23. The system of claim 13, wherein the radial distance of the optical emitter is less than a radial extent of an optical field returning from an optical pathway.

24. The system of claim 13, wherein the detector has an outer radial distance from the center point of the emitter and wherein the outer radial distance is greater than a radial extent of an optical field returning from an optical pathway.

25. The system of claim 13, wherein the optical emitter and the detector are arranged in multiple planes that are substantially perpendicular to an optical pathway.

26. The system of claim 13, wherein the optical system includes a portable housing that includes at least one of the optical emitter, detector, and logic component.

27. The system of claim 13, wherein the optical emitter, detector, and logic component are provided in an optical network to provide testing functionality during operation of the network.

28. The system of claim 13, wherein the system includes a transmitter for communicating test information to a remote device.

29. An optical transmitting and receiving system, comprising:
- an optical fiber having an optical pathway and having an end surface used by both an optical emitter and an optical detector;
- the optical emitter extending a radial distance from a center point and positioned at a distance from the end surface to emit a light wave through the optical pathway; and
- the optical detector provided around at least a portion of the optical emitter and positioned outside the radial distance of the optical emitter to receive a reflected light wave, which includes at least a portion of the light wave emitted, directed toward the photodetector through the optical pathway.

30. The system of claim 29, wherein the optical emitter is a VCSEL.

31. The system of claim 29, wherein the optical detector is a p-i-n diode.

32. The system of claim 29, wherein the optical emitter and detector are formed along a single plane.

33. The system of claim 29, wherein the optical emitter and detector are formed as a multi-level component.

* * * * *